Oct. 8, 1968     A. G. KURISU     3,404,730
TEMPERATURE CONTROL ARRANGEMENT
Filed Dec. 2, 1966
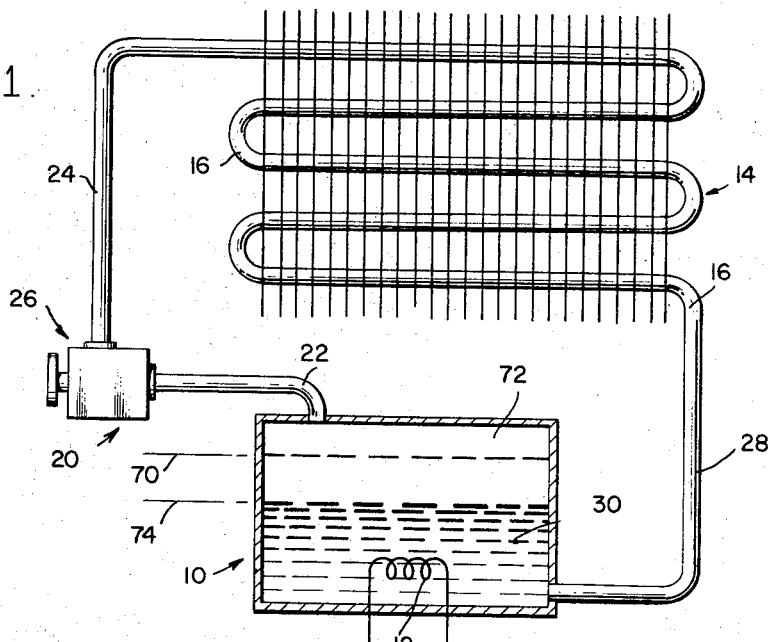
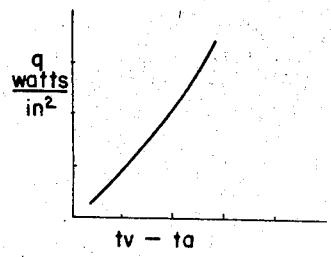
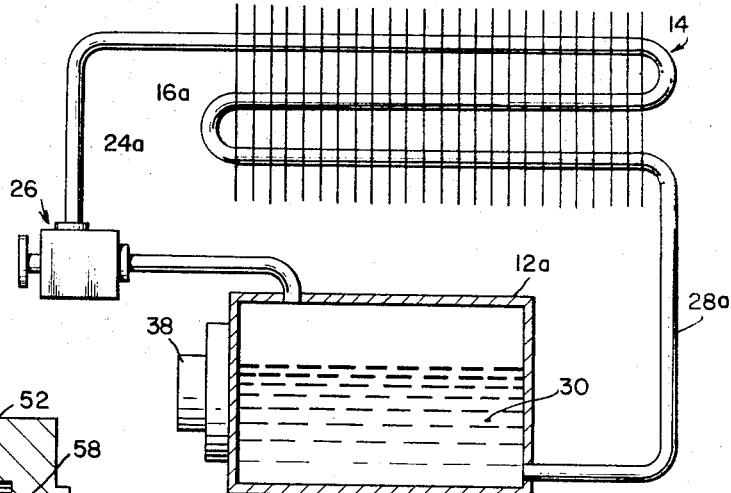
Albert G. Kurisu,
INVENTOR.
BY
ATTORNEY.

United States Patent Office 3,404,730
Patented Oct. 8, 1968

3,404,730
TEMPERATURE CONTROL ARRANGEMENT
Albert G. Kurisu, Anaheim, Calif., assignor to Hughes Aircraft Company, Culver City, Calif., a corporation of Delaware
Filed Dec. 2, 1966, Ser. No. 598,850
1 Claim. (Cl. 165—32)

ABSTRACT OF THE DISCLOSURE

A closed system comprising a heat dissipating chamber and a heat dissipating condenser using ambient air as a heat sink. A first conduit having flow control valve means therein interconnects the chamber and condenser and a second open communication conduit interconnects the chamber and condenser. A heat load is disposed in the chamber and submerged in a liquid therein, the vaporization of the liquid cooling the load. The valve means opens and closes in response to vapor pressure in the chamber while the difference between the vapor pressure in the chamber and condenser controls the effective heat dissipation area of the condenser to thereby create a heat balance in the system and maintain the load at a relatively constant temperature.

---

The invention relates to a temperature control arrangement and particularly to a system operative to maintain a heat load in a closely controlled ambient temperature range regardless of temperature variations which may occur in the system environment.

Many device, particularly electronic units, require, for accurate operation, the maintenance of a closely controlled temperature level. An example of such an electronic device is a microwave producing klystron. In a klystron the microwave output may be controlled, with a certain degree of accuracy, by conventional feedback type electronic equipment that, for example, varies input voltage to the klystron in response to a monitored variation in the klystron wave output. Certain practical reasons, however, have demonstrated that such feedback equipment is only effective within a relatively narrow range of output variation from norm using reasonably priced feedback control equipment. An important reason for klystron output variation has been found to be changes in its physical dimensions resulting from expansion and contraction of its various components in response to temperature variation of the unit. Klystron output changes resulting from such physical dimensional variations may be of such degree as to prohibit effective output control of the klystron by the mentioned conventional electronic feedback equipment. To avoid this difficulty, it is desirable to maintain the klystron at its optimum operating temperature level by positioning the unit within a device capable of closely controlling a klystron ambient temperature condition and effectively removing heat generated thereby.

There are many environmental control devices which are currently commercially available. Most of these commercially available units have the capability of providing controlled ambient condition with sufficient accuracy that a klystron or other similarly functioning device may be held within a reasonable tolerance of optimum operating temperature level. Experience has shown, however, that most of these commercially available devices possess the disadvantages of high initial cost, high operating temperature levels, expensive operation and continuing service attention to avoid mechanical breakdown. In these aspects they are generally unsatisfactory for use in those applications which are directed to commercial markets where low initial cost, service life, and continued maintenance free operation are usually the controlling factors in equipment adaptation.

With the above in mind, it is a primary object of the invention to provide an arrangement to provide closely controlled environmental temperature condition which may be adapted for use with the mentioned electronic devices or the like.

It is a further object of the invention to provide a controlled optimum minimum operating temperature for a selected electronic device even though external environmental temperature varies through a given temperature range.

It is a further object of the invention to provide a temperature control arrangement of uncomplicated design offering economical first cost and providing trouble-free service life.

It is a further object of the invention to provide an arrangement for controlled environmental temperature for the mentioned electronic device wherein the device is bathed in a liquid of high dielectric strength which contributes to miniaturization and system safety in view of the fact that many such electronic devices operate at high voltage.

It is a further object of the invention to provide such liquid environment for the mentioned heat load, i.e., electronic device, wherein the liquid has sharply defined boiling temperature at any pressure level to thereby effectuate close temperature control, the control functionally responding to vapor pressure.

It is yet a further object of the invention to provide a liquid environment of the type described within a closed system whereby vapor pressure in the primary heat load chamber controls system circulation and therefore the operating temperature level of each segment of the system.

Still another object of the invention is to provide a closed system of the type described which is essentially free from contaminants and thereby contribute to satisfactory operation and long service life.

Still another object of the invention is to provide an arrangement of the type described that is readily adaptable to miniaturization and compact design and hence compatible with modern trends toward utility combined with minimum spatial requirements.

These and other objects of the invention will become apparent in the course of the following description and from an examination of the related drawings wherein:

FIG. 1 is a schematic view of a system employing the invention;

FIG. 2 is a schematic view of a system similar to FIG. 1 illustrating the modification of the disclosed invention;

FIG. 3 is a vertical cross-sectional view of a typical control valve that may be utilized in the invention; and FIG. 4 is a graph illustrating condenser capacity in reference to the difference between vapor temperature and ambient temperature.

Describing the invention in detail and directing attention to FIG. 1, a first chamber indicated generally at 10 is provided. The chamber 10 may be designated a boiler and has disposed therein a heat load as shown at 12. As earlier described, the heat load may be a klystron for microwave output or other electronic device. A typical klystron may operate at 1500 volts and dissipate 150 watts during operation.

A condenser is indicated generally at 14. The condenser 14 comprises a plurality of tubes 16, 16, said tubes being in heat exchange relation with ambient air. The air may be forced over the tube 16 by a conventional fan or propeller. If desired, the tubes 16 may be conventionally finned or otherwise constructed so as to increase thermal exchange relationship capability with the air moving thereover.

A boiler-to-condenser input line is indicated generally at 20 and comprises a first segment 22 communicating with boiler 10 and a second segment 24 communicating with the condenser 14. A modulator valve is indicated generally at 26 and is disposed in line 20 intermediate the segments 22 and 24. Obviously, the valve 26 controls flow from the segment 22 to the segment 24 and therefore controls vapor flow from the boiler 10 to the condenser 14. A return line 28 communicates at one end thereof with the condenser 14 and at the other end thereof with the boiler 10, the purpose of which will be hereafter described in detail.

A liquid, indicated at 30, is contained within the chamber defined by boiler 10. The liquid 30 is preferably chosen to operate at a vapor pressure slightly higher than atmospheric pressure under optimum operating temperature of the electronic device as evidenced by heat load 12. For example, with the klystron noted above operating at an optimum body temperature of 175° F., Freon 113 is an excellent vehicle. At the optimum temperature condition within the system, as designed, the Freon 113 vapor pressure is 15 p.s.i.g. at 160° F. and the heat of vaporization thereof is effective to dissipate the heat from the load 12 to the Freon vapor as it boils. Additionally, Freon 113 has a high dielectric strength which insulates against accidental electrical short between the klystron and the boiler 10 providing, of course, the operating limitations hereinafter described are adhered to. It will be understood, however, that, depending on the heat load anticipated and the optimum operating temperature of that heat load, other liquids may be used.

Attention is now directed to FIG. 3 which is a detailed view of a preferred form of the modulating valve 26 above referred to. The valve comprises a valve housing 32 having an internal annular aperture 34 passing therethrough. Aperture 34 may be threaded at its upper end 36 to threadably receive a base element 38. The base element 38 is centrally apertured and threaded as at 40 to receive an adjustable cap 42, the latter being provided with a central hole 44 communicating with a chamber 46 internally of the housing 32. An inlet port 48 is provided in the housing 32 and communicates with line segment 22 of FIG. 1. An outlet port 50 perpendicular to inlet port 48 is formed in the wall of the housing 32 and communicates with line segment 24 of FIG. 1. A bellows 52 is disposed in the chamber 34, its upper aspect being annularly connected to cap 38 as at 54. At its lower aspect the bellows 52 is annularly connected to a valve element 56 as at 58. Conventional soldering technique may be used to establish these connections. The valve element 56 may be seatably associated with a valve seat 60, for example, by means of the annular O-ring 62 carried by the valve element 56. An O-ring 64 may be provided to seal the element 38 to the housing 32. Internally of the chamber 46 a coiled spring 66 may be positioned, said spring having its opposed ends in pressured engagement with the adjusting cap 42 and with a retainer 68, the latter being seated on valve element 56.

In valve operation, spring 66 and bellows 52 serve to bias the valve element 56 to closed position with seat 60 as illustrated in the figure. The biasing force of the spring 66 combines with atmospheric pressure present in the chamber 46, the latter being admitted by hole 44, to induce the closing biasing pressure. The closing biasing pressure counteracts any pressure that may be existent at inlet port 48 which in turn communicates with line 22. The operation of valve 26 will hereinafter be described in detail.

Returning to FIG. 1, it will be recalled that the boiler 10 has a liquid 30 disposed therein. Prior to operation, the boiler 10 is filled to a first or high liquid level indicated by the line 70. The entire system is, of course, closed and purged of air. Vapor pressure exists in the chamber 72 above the liquid surface 70 in boiler 10, in conduit 28 and the condenser 14. Of course, valve 26 is initially closed.

As system operation is initiated heat load 12 dispels heat to the liquid 30 inducing convective movement thereof, the heat causing the temperature of liquid 30 to rise while the temperature of the condenser remains constant. Vapor pressure in chamber 72 increases and the vapor pressure in condenser 14 remains constant. This pressure differential displaces some liquid 30 from boiler 10 to condenser 14 through line 28. The minimum or lower level is shown by line 74. Under this condition the liquid fills conduit 28, condenser 14 and line segment 24. With the condenser 14 filled with liquid, there is little effective dissipating of heat to ambient atmosphere. Upon continued heat dissipation from load 12, the pressure in chamber 72 further rises until such time as it is great enough to overcome the combined resistive biasing force of spring 66 and the atmospheric pressure within bellows 52. As this resistive pressure is overcome, valve element 56 is unseated and a portion of the vapor within chamber 72 is allowed to escape through valve 26 into line segment 24 and condenser 14, thus lowering the level of liquid therein. The condensation of vapor within the condenser 14 begins and the heat previously absorbed is released to ambient via convective thermal transfer action between elements 16 and the air moving thereover. The heat released is equal to the heat dissipated to the fluid 30 by load 12, and load 12 is maintained at its optimum operating temperatures (160° F. in the example).

It is to be noted that condenser 14 capacity is largely a function of the effective area of the condenser exposed to the vapor therein and the temperature difference between the vapor and the ambient air which acts as a heat sink. FIG. 4 graphically illustrates the variation in condenser heat load of in watts per square inch versus the vapor-ambient air temperature differential.

It follows that for a given condenser heat load and ambient air temperature, the average condenser vapor temperature and its corresponding vapor pressure is established. This in turn establishes the pressure differential existing between boiler 10 and condenser 14. This pressure differential establishes the liquid heat in the condenser by virtue of the liquid flowing in line 28 and, of course, the effective condenser area to which vapor may be exposed. Thus, for any combination of condenser heat load and ambient air temperature the effective area of the condenser is automatically adjusted to maintain system heat balance while maintaining a constant boiler 10 temperature.

Under conditions requiring maximum condenser capacity the valve 26 is fully opened and the vapor passes freely from chamber 72 to the condenser 14. Under this condition there is little, if any, of the liquid 30 in the condenser 14 except that appearing as a result of condensation of the vapor forced therethrough. During condensation heat is released to ambient at condenser 14 and the condensate return via line 28 to the boiler 10. It should be particularly noted that sufficient liquid 30 should be placed within boiled 10 so that under all operating conditions the surface of the liquid 30 never goes below line 74 thus maintaining the load 12 constantly bathed in liquid and cooled by the vaporizing of the liquid. If the liquid level falls below the heat load, overheating and device burnout could be anticipated. Additionally, the dielectric strength of the liquid is considerably higher than the dielectric strength thereof in its vapor phase. Therefore, maintaining the level 74 above the heat load 12 at all times prevents accidental electrical short from the heat load 12 to the walls of the boiler 10. The arrangement, in effect, provides condensing and heat dissipating capacity response to load during all operating conditions.

FIG. 2 is a slightly modified embodiment of the system disclosed and described with reference to FIG. 1. Identical parts are indicated with identical numerals. In this embodiment the boiler 12a is unitary and the heat source 78 is located externally thereof and mounted thereon so as to be in thermally conductive heat transfer relation therewith. The heat source 78 therefore may dissipate part of its heat to ambient atmosphere but a majority thereof is conductively carried to the fluid 30 within closed boiler 12a. Valve 26 operates in a manner identical with the operation described with reference to FIG. 1 as does condenser 14. Thus, in the operation of the embodiment of FIG. 2, heat is initially conductively transferred through the boiler 12a to the internal cooling fluid whereat it boils and turns to its vapor phase. Vapor pressure is built up within boiler 12a sufficient to open valve 26 and force vapor into the condenser 14. Upon condensation it is returned to boiler 12a via line 28. In essence, therefore, the embodiment of FIG. 2 functions identically with that described above.

The valve 26 described utilizes ambient (atmospheric) pressure as a control reference. As will be well understood by experienced technical persons a sealed or aneroid valve may be substituted which could use as a reference pressure the biasing force of an internal spring alone. Alternately, a temperature responsive valve could be substituted for valve 26 which would open and close in response to a sensed temperature level of the liquid in boiler 10.

In summary it will be apparent that an efficient, economical arrangement has been provided which will provide a mode of controlled heat dissipation from a load and is thus effective to maintain the load at an operating optimum temperature level.

The invention as described in a preferred form may patently be modified in many respects all within the spirit thereof and scope of the appended claim.

I claim:

1. In a closed circuit arrangement to maintain a heat load and a desired temperature level,
    the combination of a container having a cooling liquid therein,
    said heat load being disposed in the container,
    the minimum level of liquid in said container being above the heat load so that the latter is continously bathed in cooling liquid,
    a condenser spaced from the container,
    a first conduit connecting the container to the condenser,
    valve means in the first conduit normally biased to closed condition to prevent communication between the container and the condenser,
    a second conduit interconnecting the container and condenser normally open to allow liquid in the container to back flow therethrough and partially fill the condenser,
    said liquid vaporizing in response in heat given off by the load to thereby create a vapor pressure in the liquid over the container to accomplish said back flow of said liquid to the condenser,
    the back flow of liquid to the condenser variably filling the latter and regulating the cooling capacity of the condenser in response to the vapor pressure condition existing in the container,
    and increase of the pressure of said vapor of said container being operative to induce the opening of said valve means and establish communication via the first conduit between the container and the condenser to allow vapor from the container to move to the condenser for cooling and liquefaction.

References Cited
UNITED STATES PATENTS

| | | | |
|---|---|---|---|
| 2,083,611 | 6/1937 | Marshall | 165—105 |
| 3,327,772 | 6/1967 | Kodaira | 165—105 |

ROBERT A. O'LEARY, *Primary Examiner.*

C. SUKALO, *Assistant Examiner.*